US011077632B2

(12) United States Patent
Folgar et al.

(10) Patent No.: US 11,077,632 B2
(45) Date of Patent: Aug. 3, 2021

(54) MICROWAVE POST-PROCESSING FOR ADDITIVE MANUFACTURING

(71) Applicant: 3D Systems, Inc., Rock Hill, SC (US)

(72) Inventors: Luis N Folgar, Lake Oswego, OR (US); Carlos E Folgar, Painted Post, NY (US); Francisco Folgar, Midlothian, VA (US); Christian E Folgar, Langhorne, PA (US); Jim Williams, Erwinna, PA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 619 days.

(21) Appl. No.: 14/212,399

(22) Filed: Mar. 14, 2014

(65) Prior Publication Data

US 2016/0366728 A1  Dec. 15, 2016

Related U.S. Application Data

(60) Provisional application No. 61/787,704, filed on Mar. 15, 2013.

(51) Int. Cl.
*B29C 71/04* (2006.01)
*B29C 64/30* (2017.01)
(Continued)

(52) U.S. Cl.
CPC ............. *B29C 71/04* (2013.01); *B29C 64/30* (2017.08); *H05B 6/64* (2013.01); *B29C 64/364* (2017.08); *B29C 2035/0855* (2013.01)

(58) Field of Classification Search
CPC ........ B29C 67/0051; B29C 2035/0855; B29C 64/10; B29C 64/00; B29C 71/04;
(Continued)

(56) References Cited

U.S. PATENT DOCUMENTS 5,449,887 A * 9/1995 Holcombe ............... H05B 6/80
219/679
5,609,891 A * 3/1997 Delaunay ................ B29C 33/06
264/489

(Continued)

FOREIGN PATENT DOCUMENTS

EP  0450762  10/1991
GB  2422344  7/2006

OTHER PUBLICATIONS

PCT International Search Report the International Searching Authority for PCT/US2014/028085 dated Nov. 26, 2014 (6 pages).

(Continued)

*Primary Examiner* — Jeffrey M Wollschlager
*Assistant Examiner* — Xue H Liu
(74) *Attorney, Agent, or Firm* — J. Clinton Wimbish; Nexsen Pruet, PLLC

(57) ABSTRACT

In one aspect, methods of post-processing an object made by additive manufacturing are described herein. In some embodiments, a method of post-processing an object described herein comprises providing the object in a microwave absorptive state and exposing the object in the absorptive state to a field of microwave radiation. In some cases, providing an object in a microwave absorptive state comprises heating the object, including by non-microwave heating. Moreover, in some embodiments, the object is exposed to a uniform or substantially uniform field of microwave radiation in a microwave cavity. In addition, in some instances, exposing an object to a field of microwave radiation in a manner described herein comprises increasing the density of the object and/or reducing the volume of the object, including in an isotropic or substantially isotropic manner.

19 Claims, 4 Drawing Sheets

(51) Int. Cl.
*H05B 6/64* (2006.01)
*B29C 35/08* (2006.01)
*B29C 64/364* (2017.01)

(58) Field of Classification Search
CPC ... B29C 64/30; B29C 64/364; A61C 13/0013; B28B 1/00
USPC ........................................ 264/432, 489, 345
See application file for complete search history.

(56) References Cited

U.S. PATENT DOCUMENTS

| | | | |
|---|---|---|---|
| 6,155,331 A * | 12/2000 | Langer | B22C 1/00 164/15 |
| 6,197,243 B1 * | 3/2001 | Tiegs | C04B 35/584 219/759 |
| 6,512,216 B2 * | 1/2003 | Gedevanishvili | B22F 3/105 219/756 |
| 6,812,441 B2 * | 11/2004 | Cheng | C04B 33/14 219/686 |
| 2003/0222366 A1 | 12/2003 | Stangel et al. | |
| 2004/0222561 A1 | 11/2004 | Hopkins | |
| 2005/0184434 A1 * | 8/2005 | Akopyan | B29C 33/3828 264/328.1 |
| 2010/0292374 A1 | 11/2010 | Bellare | |

OTHER PUBLICATIONS

PCT Written Opinion of the International Searching Authority for PCT/US2014/028085 dated Nov. 26, 2014 (4 pages).

\* cited by examiner

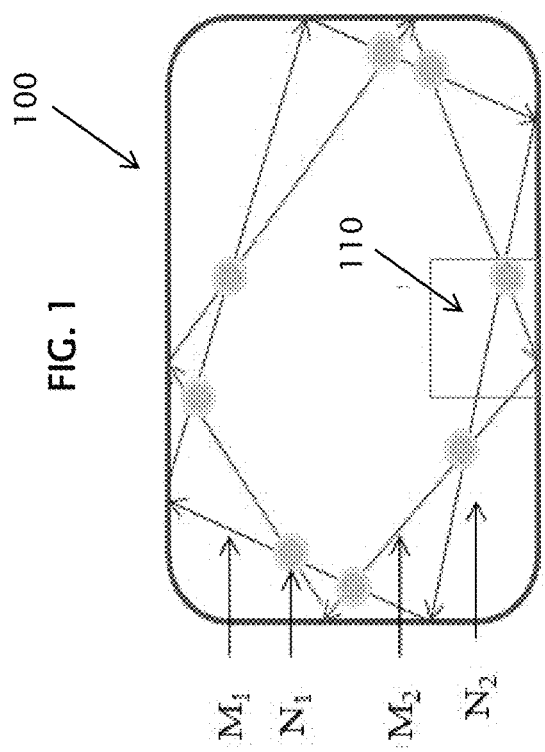
FIG. 1
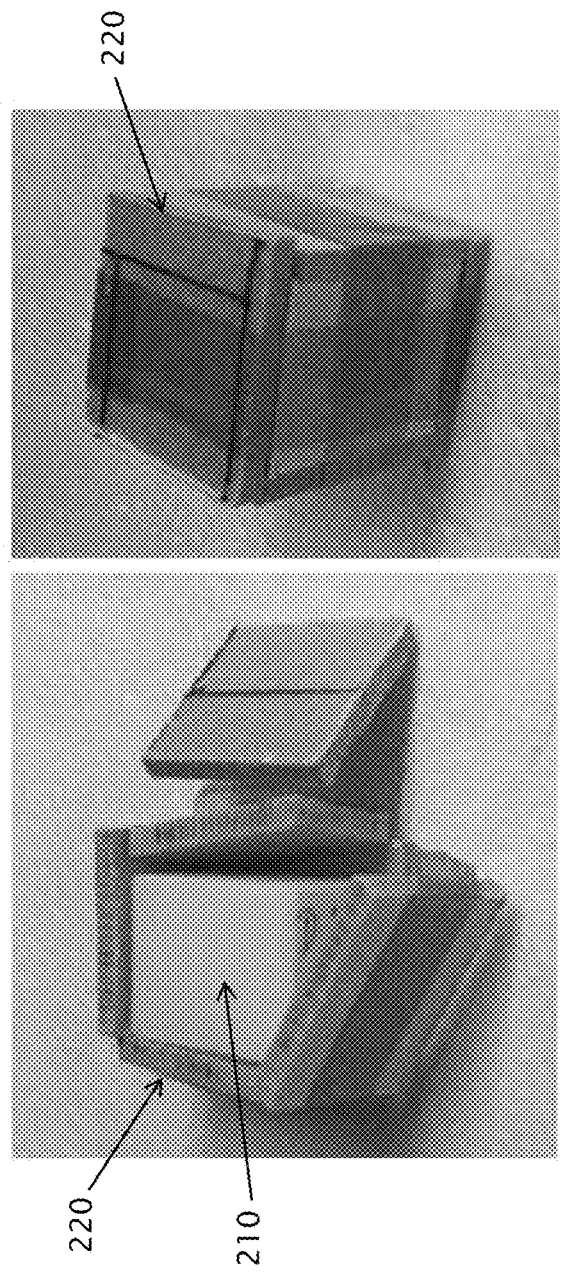
FIG. 2A
FIG. 2B an object during exposure of the object to a field of microwave radiation. Such a change in the chemical and/or physical structure of an object, in some cases, comprises a change in the structure of the build material of the object, such as a chemical or physical change to a polymer of the build material. Alternatively, in other instances, a change in the chemical and/or physical structure of an object comprises a change in the structure of a material disposed between adjacent layers of build material forming the object, such as a bonding agent disposed between the layers.

MICROWAVE POST-PROCESSING FOR ADDITIVE MANUFACTURING

CROSS REFERENCE TO RELATED APPLICATION

This application claims priority pursuant to 35 U.S.C. § 119 to U.S. Provisional Patent Application Ser. No. 61/787,704, filed on Mar. 15, 2013, which is hereby incorporated by reference in its entirety.

STATEMENT REGARDING FEDERALLY SPONSORED RESEARCH OR DEVELOPMENT

This invention was made with Government support under Agreement/Contract No. FA8650-10-5705 awarded by the U.S. Air Force Research Laboratory. The Government has certain rights in the invention.

FIELD

The present invention relates to post-processing methods for additive manufacturing processes and, in particular, to post-processing methods using microwave radiation.

BACKGROUND

Additive manufacturing or three-dimensional (3D) printing technologies create physical objects from 3D data, typically by providing, curing, or fusing material in a layer-by-layer manner. Additive manufacturing technologies include but are not limited to extrusion based 3D printing, stereolithography, selective laser sintering (SLS), multi-jet modeling, binder-on-powder 3D printing, laminated object manufacturing, and other technologies. Many of these technologies require or can be used with additional post-processing steps to clean, strengthen, and/or otherwise improve the quality of the object or part initially made in the additive manufacturing system (often called a "green part").

However, some previous post-processing methods are unable to improve the density, porosity, and/or homogeneity of a printed object in three dimensions. Therefore, improved post-processing methods are desired.

SUMMARY

In one aspect, methods of post-processing an object or part made by additive manufacturing are described herein. Such methods, in some embodiments, may provide one or more advantages compared to other post-processing methods. In some cases, for instance, a method described herein can increase the homogeneity or uniformity of the internal structure of an object, including in three dimensions. For example, in some embodiments, a method described herein can provide an object having one or more isotropic or substantially isotropic physical or mechanical properties. Such properties can be substantially the same in a build direction of the object and in one or more lateral directions perpendicular to the build direction. The build direction can be a z-direction perpendicular to the planes of the individual layers or thin cross-sections of the object. A lateral direction can be an x- or y-direction parallel to the planes of the individual layers or thin cross-sections of the object. For example, in some cases, a method of post-processing an object described herein can provide objects having a uniform or isotropic density, porosity, and/or tensile strength.

Other isotropic or substantially isotropic properties can also be provided by a method of post-processing an object described herein.

In some embodiments, a method of post-processing an object comprises providing the object in a microwave absorptive state and exposing the object in the absorptive state to a field of microwave radiation. In some cases, providing an object in a microwave absorptive state comprises heating the object, including by non-microwave heating. In other instances, heating is not required to provide an object in a microwave absorptive state. Moreover, in some embodiments, exposing the object to the field of microwave radiation is carried out in a microwave cavity. Further, the field of microwave radiation can be a uniform or substantially uniform field. In addition, in some instances, exposing an object to a field of microwave radiation comprises increasing the density of the object and/or reducing the volume of the object, including in an isotropic or substantially isotropic manner.

A method of post-processing an object described herein, in some embodiments, further comprises drying the object prior to exposing the object to the field of microwave radiation. A method described here can also comprise placing an object within a thermally insulating container prior to exposing the object to a field of microwave radiation. Additionally, in some instances, a method described herein further comprises supporting the object with a support structure prior to and/or during exposure of the object to a field of microwave radiation. The support structure, in some cases, is a form fitting structure disposed on the exterior surface of the object. Further, in some embodiments, a positive or negative pressure can be applied to the object during exposure of the object to a field of microwave radiation.

In addition, a method described herein can comprise exposing an object to a field of microwave radiation for a time period sufficient to achieve a desired result, such as a desired increase in density and/or uniformity of the object.

Moreover, a method of post-processing an object described herein, in some cases, can further comprise carrying out one or more additional post-processing steps following completion of a microwave irradiation step. For example, in some instances, a method further comprises carrying out an additional heating step, cooling step, curing step, and/or infiltration step.

Further, in some cases, prior to carrying out post-processing steps on an object, a method described herein includes printing or forming the object by an additive manufacturing method, such as by extrusion based 3D printing, stereolithography, selective laser sintering (SLS), multi-jet modeling, or binder-on-powder 3D printing.

In another aspect, objects formed or made by additive manufacturing are described herein. In some embodiments, such an object comprises a plurality of stacked layers formed from a build material, the layers being bonded to one another in the z-direction, wherein the object has one or more isotropic or substantially isotropic physical or mechanical properties. For example, in some cases, the object has an isotropic or substantially isotropic tensile strength. In other instances, the object has an isotropic or substantially isotropic porosity or density. Moreover, the density of an object described herein, in some cases, can be at least about 97 percent of the density of the build material before it is used to form the object.

In addition, one or more isotropic or substantially isotropic properties can be provided to an object described herein by a change in the chemical and/or physical structure of the object in the z-direction. Such a change can result from treatment of the object according to a post-processing method described hereinabove. Further, one or more isotropic or substantially isotropic properties can be provided to an object having a high feature resolution without substantially decreasing the feature resolution of the object. For instance, in some cases, an object described herein has a feature resolution of about 100 μm or less both before and after post-processing according to a method described herein.

These and other embodiments are described in greater detail in the detailed description which follows.

BRIEF DESCRIPTION OF THE DRAWINGS

FIG. 1 illustrates schematically a sectional view of a microwave cavity suitable for use in methods of post-processing an object according to some embodiments described herein.

FIGS. 2A and 2B illustrate perspective views of an object disposed in a support structure according to one embodiment described herein.

DETAILED DESCRIPTION

Figure 3:
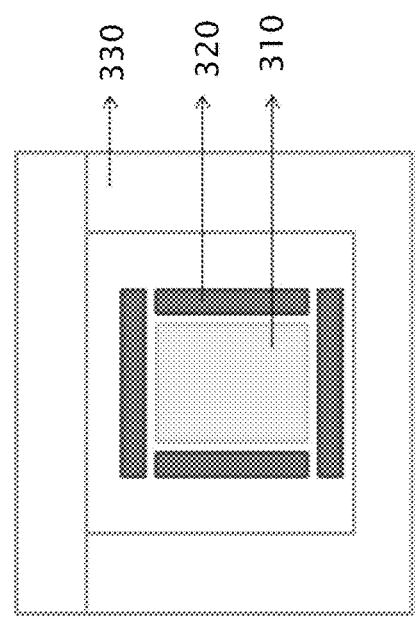
FIG. 3 illustrates schematically a sectional view of an object disposed in a support structure and a thermally insulating container according to one embodiment described herein.

Embodiments described herein can be understood more readily by reference to the following detailed description, examples, and drawings. Elements, apparatus and methods described herein, however, are not limited to the specific embodiments presented in the detailed description, examples, and drawings. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Additionally, when the term "about" is used to modify an amount or quantity, it is to be understood that the amount or quantity can be within 5 percent of the stated amount or quantity, unless expressly stated otherwise. For example, an amount of "about 100" should generally be considered to include an amount between 95 and 105.

I. Methods of Post-Processing an Object

In one aspect, methods of post-processing an object formed by additive manufacturing are described herein. In some embodiments, a method of post-processing an object comprises providing the object in a microwave absorptive state and exposing the object in the absorptive state to a field of microwave radiation. A method described herein, in some cases, further comprises drying the object prior to exposing the object to the field of microwave radiation. A method described herein can also comprise placing the object within a thermally insulating container prior to exposing the object to the field of microwave radiation. Additionally, in some instances, a method described herein further comprises supporting the object with a support structure prior to and/or during exposure of the object to the field of microwave radiation. Further, in some embodiments, a method of post-processing an object further comprises applying a pressure to the object during exposure of the object to the field of microwave radiation. In addition, a method described herein can comprise exposing the object to a field of microwave radiation for a time period sufficient to achieve a desired result, such as a desired increase in density and/or uniformity of one or more mechanical properties of the object.

Moreover, a method of post-processing an object described herein, in some cases, can further comprise carrying out one or more additional post-processing steps following completion of a microwave irradiation step described herein. For example, in some instances, a method further comprises carrying out an additional heating step, cooling step, curing step, and/or infiltration step following exposing the object to a field of microwave radiation.

Further, in some cases, prior to post-processing an object, a method described herein includes printing or forming the object by an additive manufacturing method, such as a method comprising extrusion based 3D printing, stereolithography, selective laser sintering (SLS), multi-jet modeling, or binder-on-powder 3D printing.

Turning now to specific steps of methods, methods of post-processing an object described herein comprise providing the object in a microwave absorptive state. A "microwave absorptive state" of an object, for reference purposes herein, is a state in which the object exhibits a dielectric loss between about 0.1 and about 5, when exposed to a specific range of microwave frequencies. In particular, the range of microwave frequencies can correspond to one or more frequencies of the field of microwave radiation to which the object is subsequently exposed according to a method described herein. In general, microwave frequencies comprise frequencies between about 300 megahertz (MHz) and about 300 gigahertz (GHz) or between about 500 MHz and about 100 GHz.

The dielectric loss ($\epsilon''_{eff}$) of an object in a microwave absorptive state can be described by Equation (1) below:

$$p = 2\pi f(\epsilon''_{eff})(\epsilon_0)E_{RMS}^2 \qquad (1),$$

where p is the absorbed power density, f is the microwave frequency, $\epsilon_0$ is the permittivity of free space, and $E_{RMS}$ is the root-mean-square value of the electric field. Further, it should be noted that $\epsilon''_{eff}$ can vary as a function of temperature as well as frequency. The dielectric loss of an object described herein can be measured in any manner not inconsistent with the objectives of the present invention. In some cases, dielectric loss is measured using cavity perturbation analysis.

An object described herein can be provided in a microwave absorptive state in any manner not inconsistent with the objectives of the present invention. In some embodiments, for instance, providing an object in a microwave absorptive state comprises heating the object. Specifically, the object can be heated to a temperature at which the object exhibits a desired dielectric loss, such as a dielectric loss between 0.1 and 5 at a desired range of microwave frequencies, including a range of microwave frequencies described hereinbelow for a field of microwave radiation. As understood by one of ordinary skill in the art, the temperature at which a given object will exhibit such a desired dielectric loss can vary based on the chemical composition of the object. In some cases, for example, an object formed from nylon may be heated to a temperature greater than about 110° C. In other instances, an object described herein can be heated to a temperature greater than about 100° C., greater than about 120° C., greater than about 130° C., greater than about 150° C., or greater than about 200° C. In some embodiments, an object described herein is heated to a temperature between about 100° C. and about 250° C., between about 120° C. and about 225° C., between about 130° C. and about 200° C., or between about 110° C. and about 140° C. Other temperature ranges can also be used.

Moreover, heating an object to provide the object in a microwave absorptive state can be carried out in any manner not inconsistent with the objectives of the present invention. In some cases, heating comprises conventional heating rather than microwave heating. For example, in some embodiments, heating comprises disposing the object in an oven or exposing the object to a heat lamp.

In addition, in some methods described herein, a heating step may not be required in order to provide an object in a microwave absorptive state. For example, in some cases, an object described herein may have a composite construction including one or more filler materials disposed in a matrix material. In some instances, the filler materials may be electrically conductive filler materials such as metal filler materials or carbon nanoparticle filler materials. In some such cases, the object may exhibit the desired dielectric loss at room temperature (25° C.) and/or at a temperature that does not require a heating step described hereinabove.

Methods of post-processing an object described herein also comprise exposing the object to a field of microwave radiation. As described above, the field of microwave radiation can comprise electromagnetic radiation having any range of microwave frequencies not inconsistent with the objectives of the present invention. In some embodiments, the microwave radiation has an average frequency between about 300 MHz and about 300 GHz, between about 500 MHz and about 100 GHz, or between about 700 MHz and about 10 GHz. In some cases, the microwave radiation is centered in an industrial, scientific, and medical (ISM) frequency band set aside for non-communication purposes, such as an ISM frequency band defined by the International Telecommunication Union Radiocommunication Sector (ITU-R) in 5.138, 5.150, or 5.280 of the Radio Regulations. For example, in some instances, the microwave radiation of a field described herein is centered at 915 MHz or 2.45 GHz. In other embodiments, the microwave radiation is centered at 433.92 MHz, 5.8 GHz, or 24.125 GHz.

In addition, a field of microwave radiation described herein can be a uniform or substantially uniform field of microwave radiation. A "uniform" field of microwave radiation, for reference purposes herein, comprises a field that has the same power density throughout the region in which the field is applied, such as throughout a microwave cavity. A "substantially" uniform field of microwave radiation, for reference purposes herein, comprises a field that has a power density that varies by less than about 10 percent, less than about 5 percent, or less than about 1 percent throughout the region in which the field is applied, based on the average value of the power density in the region. As understood by one of ordinary skill in the art and as described further hereinbelow, a uniform or substantially uniform field of microwave radiation can be provided in a variety of ways. Any method, system, or apparatus not inconsistent with the objectives of the present invention may be used to provide a uniform or substantially uniform field of microwave radiation.

Further, in some cases, the field of microwave radiation is a mode-switched field. A "mode-switched" field, for reference purposes herein, comprises a field that exhibits two or more differing microwave modes during exposure of the object to the field, where the modes vary as a function of time. A "microwave mode," for reference purposes herein, comprises a specific spatial distribution of the power of the microwave field with respect to the object being exposed to the field. Thus, in some embodiments, exposing an object to a field of microwave radiation comprises exposing the object to a plurality of modes of the field. Switching modes during exposure, in some cases, can permit dynamic post-processing of the object. Not intending to be bound by theory, it is believed that exposing an object to a field of microwave radiation described herein can alter the internal physical and/or chemical structure of the object. Further, such alteration can occur continuously or substantially continuously during a microwave exposure step described herein. Moreover, such alteration can change the microwave absorptive properties of the object. Thus, in some cases, it may be advantageous to switch the mode of the field of microwave radiation according to dynamic changes within the object during post-processing, including in a manner that promotes volumetric heating and/or that increases the homogeneity of the object in all dimensions. In such cases, the dielectric properties of an object at a given point in time can be determined by cavity perturbation analysis. In addition, the mode or spatial distribution of a field of microwave radiation can be characterized by in situ impedance analysis.

Moreover, in some cases, an object exposed to a field of microwave radiation in a manner described herein absorbs all or substantially all of the energy of the field of microwave radiation incident on the object. For example, in some cases, the object absorbs, rather than reflects, at least about 85 percent, at least about 90 percent, at least about 95 percent, or at least about 99 percent of the energy of the applied microwave radiation that is incident on the object. In some embodiments, the object absorbs between 85 percent and 100 percent, between 90 percent and 99 percent, between 95 percent and al 00 percent, or between 95 percent and 99 percent of the energy of the applied microwave radiation that is incident on the object. In some cases, the amount or percentage of incident microwave radiation absorbed by an object can be selected based on the power and/or mode of the applied field of microwave radiation, where a field having a lower power, for example, may permit an object to absorb a higher percentage of the incident microwave radiation power.

Further, an object can be exposed to a field of microwave radiation described herein in any manner not inconsistent with the objectives of the present invention. In some cases, for instance, exposing the object to a field of microwave radiation is carried out in a microwave cavity in which the object is disposed. Any microwave cavity not inconsistent with the objectives of the present invention may be used. In some embodiments, a microwave cavity is a microwave cavity of a commercial or industrial microwave oven. In other instances, a microwave cavity is a custom-made microwave cavity. As understood by one of ordinary skill in the art, a microwave cavity can be a resonator defined by a closed or substantially closed metal structure that confines electromagnetic fields having microwave frequencies. The structure can be hollow or filled with a dielectric material. In addition, a microwave cavity described herein can have any size and shape not inconsistent with the objectives of the present invention. In some cases, the cavity is rectangular. In other instances, the cavity is cylindrical. Moreover, a microwave cavity can be part of a multi-mode or single-mode microwave system.

An object can be exposed to a field of microwave radiation in a manner described herein for a time period and/or under other conditions effective for altering the internal physical and/or chemical structure of the object. For example, in some cases, an object is exposed to microwave radiation at a microwave power and for a time period sufficient to increase the density of the object and/or reduce the porosity of the object, including by a desired amount. In some cases, the time period is less than about 60 seconds, less than about 30 seconds, less than about 10 seconds, or less than about 5 seconds. In some instances, the time period is between about 1 second and about 200 seconds, between about 1 second and about 100 seconds, between about 1 second and about 60 seconds, between about 1 second and about 30 seconds, between about 1 second and about 10 seconds, or between about 1 second and about 5 seconds. Additionally, the microwave power used in a method described herein can comprise a power between about 500 Watts (W) and about 5000 W or between about 1000 W and about 3000 W. Other exposure times and microwave powers may also be used.

As described hereinabove, in some embodiments, exposing an object to a field of microwave radiation comprises or results in increasing the density and/or reducing the porosity of the object. The "density" of an object, for reference purposes herein, can be the bulk density or the true density of the object. Unless expressly noted otherwise hereinbelow, the term "density" is used to refer alternatively to either the bulk density or the true density. Thus, when an increase in density is described hereinbelow, it is generally to be understood that the increase can refer to an increase in either the bulk density or the true density or both. In some embodiments, the density of an object described herein can be increased by up to about 30 percent, up to about 20 percent, up to about 15 percent, up to about 10 percent, or up to about 5 percent, based on the initial density of the object, prior to post-processing in a manner described herein. In some cases, the density of an object is increased by between about 1 percent and about 30 percent, between about 5 percent and about 20 percent, or between about 5 percent and about 15 percent, based on the density of the object prior to post-processing. Moreover, in some embodiments, the density of an object is increased isotropically or substantially isotropically. An "isotropic" change in a property, for reference purposes herein, is a change in the property that occurs at the same rate in the x-, y-, and z-directions of the object, where the x-, y-, and z-directions are mutually orthogonal. Further, it is to be understood that the z-direction of an object corresponds to the build direction of the object. Moreover, the x- and y-directions of the object are understood to lie in the plane of a stacked cross-section or layer of the object. A "substantially" isotropic change, for reference purposes herein, is a change that occurs in the z-direction at a rate that differs by less than about 10 percent, less than about 5 percent, or less than about 1 percent of the average rate of change in the x- and y-directions.

In addition to density, the porosity of an object can also be altered by a post-processing method described herein. In some embodiments, for example, the porosity of an object described herein can be decreased by up to about 90 percent, up to about 80 percent, up to about 70 percent, or up to about 50 percent, based on the initial porosity of the object, prior to post-processing in a manner described herein. In some cases, the porosity of an object is decreased by between about 40 percent and about 90 percent, between about 40 percent and about 80 percent, between about 40 percent and about 70 percent, between about 50 percent and about 90 percent, between about 50 percent and about 80 percent, or between about 60 percent and about 80 percent, based on the porosity of the object prior to post-processing. Moreover, in some embodiments, the porosity of an object is decreased isotropically or substantially isotropically, where the terms "isotropically" and "substantially" isotropically are to be understood as described above.

The density and porosity of an object described herein, before or after post-processing, can be measured in any manner not inconsistent with the objectives of the present invention. For example, in some embodiments, the bulk density ($\rho_B$) can be measured using Archimedes' principle according to ASTM C373. In some cases, true density ($\rho_T$) can be measured using helium pycnometry. Further, the porosity of an object can be expressed as a percent porosity calculated according to Equation (2):

$$\%P = (1 - \rho_B/\rho_T) \times 100 \qquad (2).$$

Moreover, in some cases, exposing an object to a field of microwave radiation comprises or results in reducing the volume of the object. In some embodiments, the volume of the object decreases by up to about 30 percent, up to about 20 percent, up to about 15 percent, up to about 10 percent, or up to about 5 percent, based on the initial volume of the object, prior to post-processing in a manner described herein. In some cases, the volume of an object is decreased by between about 1 percent and about 30 percent, between about 5 percent and about 20 percent, or between about 5 percent and about 15 percent, based on the volume of the object prior to post-processing. Moreover, in some embodiments, the volume of the object is reduced isotropically or substantially isotropically, where the terms "isotropically" and "substantially" isotropically are to be understood as described above. The volume of an object described herein, before or after post-processing, can be measured in any manner not inconsistent with the objectives of the present invention.

Further, in some embodiments, an object can be exposed to a field of microwave radiation described herein for a time period and/or under other conditions effective for increasing the homogeneity or uniformity of one or more physical or mechanical properties of the object. The "homogeneity" or "uniformity" of a physical or mechanical property is to be understood to refer to the degree to which the property varies or does not vary in different spatial regions of the object. Thus, a property that is completely homogeneous or uniform in an object does not vary from location to location throughout the object. For example, a completely uniform density or porosity does not vary within the object, such that the object exhibits the same density or porosity in any random region of the object sufficiently large to exhibit bulk properties, such as a region at least about 0.1 cm$^3$ in size. The homogeneity or uniformity of a property can be described or quantified in any manner not inconsistent with the objectives of the present invention. In some cases, for example, homogeneity or uniformity is quantified using histograms derived from measurements of randomly sampled regions of the object. In other instances, homogeneity or uniformity is based on the measurement of a bulk property in each of the x-, y-, and z-directions, where a more homogeneous or uniform object exhibits less variation of the bulk property in different directions, such as in the z-direction compared to the x-direction or y-direction.

In some embodiments, increasing the homogeneity or uniformity of a property of an object comprises increasing the homogeneity or uniformity of the property by at least about 15 percent, at least about 10 percent, or at least about 5 percent, based on the initial homogeneity or uniformity of the property of the object, prior to post-processing in a manner described herein. In some cases, the homogeneity or uniformity is increased by between about 5 percent and about 15 percent, based on the homogeneity or uniformity of the property prior to post-processing.

The homogeneity or uniformity of any physical or mechanical property not inconsistent with the objectives of the present invention can be improved according to a method described herein. For example, in some embodiments, a method described herein comprises increasing the homogeneity or uniformity of one or more of the density, porosity, tensile strength, tensile modulus, break elongation, hardness, impact strength, flexural strength, flexural modulus, and heat deflection temperature of an object formed by additive manufacturing.

The mechanical properties of an object described herein can be measured in any manner not inconsistent with the objectives of the present invention. In some embodiments, for instance, tensile strength is measured according to ASTM D638, tensile modulus is measured according to ASTM D638, break elongation is measured according to ASTM D638, hardness is measured according to ASTM D2240, impact strength is measured according to ASTM D256, flexural strength is measured according to ASTM D638, flexural modulus is measured according to ASTM D792, and heat deflection temperature is measured according to ASTM D648.

Methods of post-processing an object described herein, in some embodiments, further comprise drying the object prior to exposing the object to a field of microwave radiation in a manner described herein. In some cases, drying comprises removing all or substantially all of the water from the object. For example, in some instances, drying provides a dried object having a water content of less than about 2 weight percent, less than about 1 weight percent, less than about 0.5 weight percent, less than about 0.1 weight percent, or less than about 0.01 weight percent, based on the total weight of the object. Such a dried object, when subsequently exposed to a field of microwave radiation in a manner described herein can, in some cases, respond to the field more uniformly or isotropically.

Drying an object can be carried out in any manner not inconsistent with the objectives of the present invention. In some instances, for example, drying an object comprises placing the object in an oven, under a heat lamp, under a stream of dry gas, and/or in a desiccator. Other methods of drying may also be used. Moreover, in some embodiments, drying an object can simultaneously serve as a heating step to provide the object in a microwave absorptive state.

Methods of post-processing an object described herein, in some embodiments, further comprise placing the object within a thermally insulating container prior to exposing the object to a field of microwave radiation in a manner described herein. A "thermally insulating" container, for reference purposes herein, can maintain the temperature of an object placed within the container within at least 5° C. for at least 5 minutes. Further, in some cases, the method further comprises maintaining the object within the thermally insulating container during exposure of the object to the field of microwave radiation. In such instances, the thermally insulating container can also be transparent or substantially transparent to the field of microwave radiation used. "Transparent" to the field of microwave radiation, for reference purposes herein, means the container does not absorb or reflect the microwave radiation. "Substantially" transparent, for reference purposes herein, means the container transmits at least about 80 percent, at least about 85 percent, at least about 90 percent, at least about 95 percent, or at least about 99 percent of incident microwave radiation. In some embodiments, a microwave-transparent or substantially microwave-transparent container has a dielectric loss of less than about 0.01 at microwave frequencies.

Placing and/or maintaining an object within a thermally insulating container can allow the object to remain at a desired temperature during a microwave exposure period described herein. In some instances, the thermally insulating container maintains the object at a temperature at which the object exists in a microwave absorbent state described hereinabove.

A thermally insulating container described herein can have any size and shape and be formed from any material not inconsistent with the objectives of the present invention. For example, in some cases, a thermally insulating container comprises a rectangular box. Alternatively, in other instances, a thermally insulating container is cylindrical. Other shapes may also be used. Moreover, in some embodiments, the container comprises or is formed from a porous material such as a porous ceramic material. In some cases, the container is formed from a porous alumina, silicate, or silicon nitride. Other thermally insulating, microwave-transparent materials may also be used.

In some embodiments, methods of post-processing an object described herein further comprise supporting the object with a support structure prior to and/or during exposure of the object to a field of microwave radiation in a manner described herein. Any support structure not inconsistent with the objectives of the present invention may be used. In some cases, a support structure can be transparent or substantially transparent to the microwave radiation. For example, in some embodiments, a support structure is formed from a material with a very low dielectric loss at microwave frequencies, such as mica. Other materials may also be used. In addition, in some instances, the support structure covers all or substantially all of the exterior surface of the object. "Substantially" all of the exterior surface of an object, for reference purposes herein, can comprise at least about 85 percent, at least about 90 percent, at least about 95 percent, or at least about 99 percent of the surface area of the exterior surface.

The use of a support structure, in some cases, can facilitate changes in the size and/or structure of the object in response to microwave exposure in a manner that does not result in loss of feature resolution of the object. For example, in some cases, the support structure can be a flexible or elastic structure that is able to continuously provide support to the object during microwave exposure, even if the object changes in size during microwave exposure.

The "feature resolution" of an object, for reference purposes herein, can be the smallest controllable physical feature size of the object. For example, the feature resolution can correspond to the printing resolution of the additive manufacturing method used to make the object. The feature resolution of an object can be described in terms of a unit of distance such as microns (μm), or in terms of dots per inch (dpi). As understood by one of ordinary skill in the art, a higher feature resolution corresponds to a higher dpi value but a lower distance value in μm.

In one non-limiting embodiment, a support structure is a form-fitting structure disposed on the exterior surface of the object, wherein the form-fitting structure conforms to the exterior surface of the object. In some instances, the support structure comprises a container such as a box, a bag, or a mold. For objects having complex exterior surfaces, a bag or a mold may be especially useful as a form-fitting support structure described herein. For example, a mold can itself be formed by an additive manufacturing process. In some embodiments, therefore, a custom mold can be configured to complement the exterior surface morphology of the object.

Thus, in some embodiments, supporting an object with a support structure comprises disposing the object within a box, bag, or mold. Alternatively, in other cases, supporting an object with a support structure comprises coating the exterior surface of the object with a support material, including as part of the original production of the object using additive manufacturing.

Moreover, in some embodiments, a method of post-processing an object described herein comprises applying a pressure to the object during exposure to a field of microwave radiation in a manner described herein. In some cases, the pressure is applied to the object when supported by a support structure described herein. An applied pressure can be a positive pressure or a negative pressure. For example, in some instances, a negative pressure or vacuum is applied to the object to facilitate the removal of gases or other airborne species from the interior of the object as the object undergoes a densification process or reduction in porosity in a manner described hereinabove. Applying such a pressure, in some cases, can thus facilitate an isotropic or substantially isotropic reduction in volume of the object, including in a manner that does not result in loss of feature resolution.

Methods of post-processing described herein can also comprise carrying out one or more additional post-processing steps following completion of a microwave irradiation step described herein. Any additional post-processing steps not inconsistent with the objectives of the present invention may be used. For example, in some instances, a method further comprises carrying out an additional heating step, cooling step, curing step, and/or infiltration step.

Further, in some cases, prior to post-processing in a manner described herein, a method described herein comprises printing, forming, or making the object by an additive manufacturing method. Moreover, in some embodiments, the object can be a green part prior to post-processing. An object can be printed, formed, or made by any additive manufacturing method not inconsistent with the objectives of the present invention. For example, two well-known additive manufacturing processes include selective laser sintering (SLS) and binder-on-powder 3D printing. These processes, and other additive manufacturing processes, are similar to the extent that they use layering techniques to build 3D articles or objects. In addition, as understood by one of ordinary skill in the art, such additive manufacturing processes can create objects directly from computer-generated structural data, such as computer-aided design (CAD) data.

Both SLS and binder-on-powder 3D printing form successive thin cross-sections or layers of the desired object as follows. Individual cross-sections or layers are formed by bonding together adjacent particles or grains of a particulate or granular build material (or powder) on a generally planar surface of a bed of the particulate or granular material. Each layer is bonded to a previously formed layer at the same time as the particles of each layer are bonded together to form the desired 3D object.

In SLS processes, a laser is used to bond the particles by sintering. In binder-on-powder processes, an inkjet style print head is used to deliver a liquid or colloidal binder material to the sequentially applied layers of particulate material. Specifically, as with SLS, the binder-on-powder 3D printing process involves applying a layer of a particulate build material to a surface using a counter-roller. After the particulate build material is applied to the surface, the inkjet print head delivers a liquid binder in a predetermined pattern to the layer of particulate material. The binder infiltrates into gaps in the particulate material and hardens or otherwise serves to consolidate the particulate material into a solidified layer. The hardened or otherwise consolidated binder also bonds each layer of particulate material to the previous layer. After the first cross-section or layer is formed, the previous steps are repeated, building successive cross-sections or layers until the final object is formed.

The particulate build material used in an SLS or binder-on-powder 3D printing process described herein can be a ceramic, plastic, or composite material. The liquid binder material used in a binder-on-powder 3D printing process may be organic or inorganic. The liquid binder material may also be aqueous in some cases. Typical organic binder materials include but are not limited to polymeric resins or ceramic precursors, such as polycarbosilazane. An organic binder material may also comprise one or more acrylates or methacrylates. Some exemplary inorganic binders comprise silica. Other materials may also be used.

In addition to an SLS or binder-on-powder process, an object described herein can also be formed using other additive manufacturing processes, such as extrusion based 3D printing, stereolithography, or multi-jet modeling. It is to be understood that, in general, methods of post-processing described herein are not limited to a specific additive manufacturing process for forming the object to be post-processed. Instead, it is contemplated herein that a variety of additive manufacturing processes could be used in conjunction with a post-processing method described herein.

It is further to be understood that methods described herein can comprise any combination of steps described herein not inconsistent with the objectives of the present invention. For example, in some cases, a method comprises (a) forming an object by an additive manufacturing process (such as an SLS process); (b) optionally drying the object to provide a dried object (such as by disposing the object in a conventional oven); (c) providing the object in a microwave absorptive state (such as by heating the object using a non-microwave heating process to obtain a dielectric loss between about 0.1 and about 5); (d) placing the object within a thermally insulating container (such as a microwave-transparent porous ceramic container); (e) exposing the object in the absorptive state to a field of microwave radiation (such as in a microwave cavity including a uniform or substantially uniform field of microwave radiation centered at 915 MHz or 2.45 GHz); (f) supporting the object with a support structure during exposure of the object to the field of microwave radiation (such as with a microwave-transparent form-fitting bag or mold into which the object was previously disposed); (g) applying a pressure to the object during exposure to the field of microwave radiation (such as a negative pressure); and (h) maintaining exposure of the object to the field of microwave radiation for a time period sufficient to increase the density of the object (such as by at least about 5 percent). Other combinations of steps are also possible.

II. Objects Made by Additive Manufacturing

In another aspect, printed 3D objects, parts, or articles are described herein. For reference purposes herein and consistent with the foregoing disclosure, the terms "printed 3D objects" and "objects made by additive manufacturing" are to be understood as synonymous terms. Such objects described herein, in some cases, can exhibit one or more desirable properties compared to some other printed 3D objects. For example, as described further herein, an object according to the present invention can have one or more isotropic or substantially isotropic properties.

In particular, in some embodiments, an object made by additive manufacturing comprises a plurality of stacked layers formed from a build material, the layers being bonded to one another in the z-direction, wherein the object has one or more isotropic or substantially isotropic mechanical properties. Further, the object, in some cases, has a unitary structure or composition, wherein the entirety of the object is formed from the plurality of stacked layers.

An "isotropic" mechanical property, for reference purposes herein, is a mechanical property of the object that is the same in any random region of the object sufficiently large to exhibit bulk properties, such as a region at least about 0.1 $cm^3$ in size, or that is the same in the x-, y-, and z-directions of the object, where the x-, y-, and z-directions are mutually orthogonal. Further, it is to be understood that the z-direction of an object corresponds to the build direction of the object. Moreover, the x- and y-directions of the object are understood to lie in the plane of a stacked cross-section or layer of the object. A "substantially" isotropic mechanical property of an object, for reference purposes herein, is a mechanical property of the object that differs among randomly sampled regions of the object by less than about 10 percent, less than about 5 percent, or less than about 1 percent of the average value of the property in all sampled regions, or that differs in the z-direction of the object by less than about 10 percent, less than about 5 percent, or less than about 1 percent of the average value of the property in the x- and y-directions.

In some embodiments, an isotropic or substantially isotropic mechanical property of an object described herein comprises one or more of the object's density, porosity, tensile strength, tensile modulus, break elongation, hardness, impact strength, flexural strength, flexural modulus, and heat deflection temperature. An object described herein can also have other isotropic or substantially isotropic properties. Moreover, as described hereinabove, the foregoing isotropic or substantially isotropic properties, such as density and porosity, can be provided by a change in the chemical and/or physical structure of the object in the z-direction resulting from treatment of the object according to a post-processing method described hereinabove in Section I.

In one non-limiting example, an object described herein has an isotropic or substantially isotropic tensile strength. In other cases, an object has an isotropic or substantially isotropic density. Moreover, in some such embodiments, the object has a density of at least about 97 percent of the density of the build material. In some cases, the object exhibits a density of at least about 98 percent or at least about 99 percent of the density of the build material. In some embodiments, the object exhibits a density between about 97 percent and about 100 percent, between about 98 percent and about 100 percent, or between about 97 percent and about 99 percent of the density of the build material. Densities described herein can be measured as described hereinabove in Section I.

It is to be understood that an object described herein can also have a combination of one or more isotropic or substantially isotropic properties. For example, in some cases, an object described herein has both an isotropic or substantially isotropic density described herein and also an isotropic or substantially isotropic tensile strength described herein.

In addition, as described hereinabove in Section I, methods of post-processing an object can improve the uniformity of one or more properties of the object without substantial loss of printing quality or feature resolution. Thus, in some embodiments, an object described herein can have one or more isotropic or substantially isotropic properties described hereinabove in conjunction with a high feature resolution. In some cases, for instance, an object described herein having one or more isotropic or substantially isotropic physical or mechanical properties can also have a feature resolution of about 500 μm or less, about 200 μm or less, about 100 μm or less, or about 50 μm or less. In some embodiments, an object has a feature resolution between about 50 μm and about 500 pm, between about 50 μm and about 200 μm, between about 50 μm and about 100 μm, or between about 100 μm and about 200 μm. Correspondingly, in some instances, an object described herein has a feature resolution of at least about 100 dpi, at least about 200 dpi, at least about 250 dpi, at least about 400 dpi, or at least about 500 dpi. In some cases, the feature resolution of an object is between about 100 dpi and about 600 dpi, between about 100 dpi and about 250 dpi, or between about 200 dpi and about 600 dpi.

Further, an object described herein can be formed from any build material not inconsistent with the objectives of the present invention. In some cases, for example, the build material comprises a particulate material. A particulate material, in some embodiments, can comprise an organic material, an inorganic material, or a composite material. For instance, in some cases, a particulate material comprises or is formed from a ceramic material such as alumina or an aluminosilicate. In other cases, a particulate material comprises or is formed from a polymeric material such as an acrylic resin, polyethylene, polypropylene, polyethylene oxide, polypropylene oxide, polyethyleneimine, polystyrene, a polyurethane, a polyurea, a polyester, a polyamide such as nylon, a polyimide, poly(ether ether ketone) (PEEK), poly(ether ketone ketone) (PEKK), poly(ether ketone) (PEK), poly(arylether ketone) (PAEK), poly(ether ether ketone ketone) (PEEKK), poly(ether ketone ether ketone ketone) (PEKEKK), carboxymethyl cellulose, a gelatin, a starch, chitin, chitosan, or a combination of one or more of the foregoing. Additional non-limiting examples of particulate build materials suitable for use in some embodiments described herein are described in U.S. Pat. Nos. 5,149,548; 5,204,055; 5,733,497; 7,300,613; and 8,157,908.

A build material described herein can also comprise an ink that can be jetted through a print head as a liquid to form various thermopolymer objects. In some instances, such a build material is solid at ambient temperatures and converts to liquid at elevated jetting temperatures. Such a build material, in some embodiments, can comprise one or more species of (meth)acrylates. As used herein, the term "(meth) acrylate" includes acrylate or methacrylate or a mixture thereof. In some embodiments, a build material comprises urethane (meth)acrylate resins. Additionally, in some cases, a build material can further comprise one or more waxes, such as one or more hydrocarbon waxes, hydrogenated waxes, paraffin waxes, microcrystalline waxes, fatty ester waxes, or a mixture thereof. One or more urethane waxes may also be used in a jettable build material described herein. Moreover, as understood by one of ordinary skill in the art, a build material described herein can further comprise one or more additional components such as one or more diluents, one or more photoinitiators, and/or one or more dyes or pigments. Additional non-limiting examples of build materials suitable for use in some embodiments described herein are described in U.S. Pat. No. 8,460,451; U.S. Pat. App. Pub. No. 2012/0231232; and U.S. Pat. App. Pub. No. 2014/0065378.

Moreover, in some embodiments, a build material described herein is free or substantially free of water. A build material that is "substantially" free of water, for reference purposes herein, comprises less than about 5 weight percent, less than about 1 weight percent, less than about 0.5 weight percent, or less than about 0.1 weight percent water, based on the total weight of the build material.

Some embodiments described herein are further illustrated in the following non-limiting Examples.

Example 1

Methods of Post-Processing an Object

Methods of post-processing an object according to some embodiments described herein were carried out as follows. First, an SLS process was used to form cube-shaped objects from a build material consisting of nylon-12 particles.

Then, prior to carrying out post-processing, the nylon objects were dried to remove residual moisture. Specifically, the samples were heated to 110° C. for 100 min. to ensure that all water was released from the samples. Subsequently, the samples were cooled to room temperature. During cooling, the samples were maintained in a low humidity cavity (40% humidity) to avoid water absorption.

Next, the initial bulk density, true density, and porosity of the samples were measured. In particular, bulk density ($\rho B$) was measured using Archimedes' principle according to ASTM C373. True density ($\rho T$) was measured using helium pycnometry. The percent porosity (% P) was then calculated using the formula of Equation 2 hereinabove. Exemplary results for a random sampling of nylon objects were as follows. Bulk density ranged from 0.955 to 0.967 g/cm$^3$. True density ranged from 1.121 to 1.132 g/cm$^3$. Percent porosity ranged from 13.7 to 15.5.

The samples were then exposed to fields of microwave radiation using a microwave system having two multi-mode microwave cavities. Each cavity could be configured to post-process objects having a different range of dielectric properties. Each cavity was also equipped with a temperature control system that could be used to measure the temperature distribution on the surface of a sample placed within the cavity. Each cavity was also able to provide a field of microwave radiation having a power that could be varied to develop a specific temperature profile. The distribution of the electromagnetic field (i.e., the mode) could also be varied within each cavity. FIG. 1 illustrates schematically two microwave modes ($M_1$, $M_2$) that could be provided by a microwave cavity (100) described herein. Additionally, FIG. 1 also illustrates a sample (110) disposed in the cavity (100) and further illustrates nodes (such as $N_1$ and $N_2$) where the modes ($M_1$ and $M_2$) intersect. For each experiment, a sample was disposed in one of the two cavities of the foregoing microwave system.

However, prior to disposing a sample object in the cavity for exposure to a field of microwave radiation, additional steps were taken. Previous studies of the dielectric properties of the nylon objects as a function of temperature and microwave frequency (915 MHz and 2.450 GHz) had indicated that the dielectric loss of the nylon objects was below 0.1 at temperatures below 100° C. In addition, deformation of the objects due to anisotropic or localized microwave heating was observed at temperatures higher than 140° C.

Therefore, prior to post-processing the nylon objects with a field of microwave radiation, the objects were supported with a support structure. Specifically, each sample object was disposed within a box formed from mica. The box-shaped support structure was used to help the object maintain its shape, without deformation, during the exposure step. The support structure is illustrated in FIGS. 2A and 2B. In FIG. 2A, the mica container (220) is shown open and partially disassembled, permitting the sample object (210) within to be seen. In FIG. 2B, the mica box (220) is shown closed, encasing the sample object. The mica support structure (220) was microwave transparent and maintained its structure at the temperatures experienced during the microwave exposure step. It should be noted that mica has an extremely low dielectric loss (<0.001) between room temperature and 500° C.

Following placement of a nylon object sample in a support structure box as described above, the sample was heated in a conventional, non-microwave oven to provide the object in a microwave absorptive state described herein. Specifically, the sample was heated to 110° C. This temperature was chosen because the desired dielectric loss was obtained at this temperature but the structure of the sample was observed not to change, such as by deforming or otherwise losing feature resolution. The sample was introduced into the conventional oven as configured in FIG. 2B and was heated for 45 min.

Following heating, the sample was placed inside a thermally insulating container disposed in the microwave cavity. The thermally insulating container was formed from a porous ceramic and was used to maintain the temperature of the sample during microwave exposure. The container exhibited an extremely low thermal conductivity and was microwave transparent. FIG. 3 illustrates the configuration of the sample (310) within the support structure (320) and within the thermally insulating container (330). Using this configuration, when the heated sample object was exposed to microwave radiation, the mica supporting structure helped maintain the sample structure, and the thermally insulating container helped maintain the desired temperature of the sample.

Figure 4:
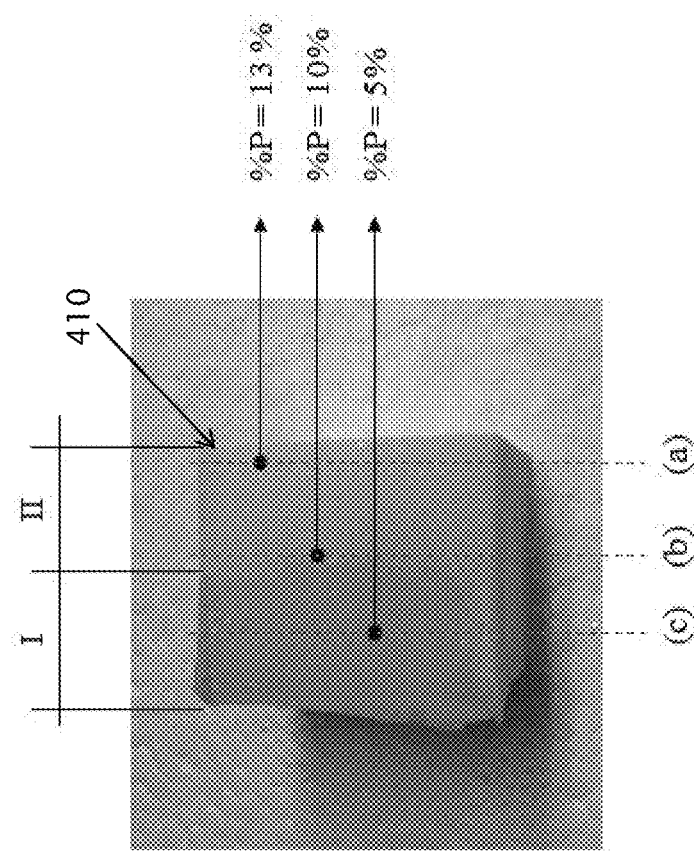
FIG. 4 illustrates a perspective view of different portions of a post-processed object according to one embodiment described herein.

The results of post-processing nylon object samples in the manner described above were as follows. It was generally observed that the porosity of the nylon objects was decreased as a result of post-processing. In one sample, a non-uniform field of microwave radiation (1000 W) was applied, and the sample demonstrated non-uniform changes in porosity as a result of microwave irradiation. This sample is illustrated in FIG. 4. As illustrated in FIG. 4, this sample (410) comprised two zones (I, II). Zone I had a lower porosity and corresponded to the part of the sample (410) that had a more significant interaction with the field of microwave radiation. Zone II had an almost negligible interaction with the field of microwave radiation and had a higher porosity. Specifically, the porosities of various portions (a, b, c) of the sample (410) were calculated using Equation (2) above, based on measurements of the bulk densities and true densities of the portions. Section (a), corresponding to Zone II, had a porosity of 13 percent. Section (b), corresponding to a region in between Zones I and II, had a porosity of 10 percent. Section (c), corresponding to Zone I, had a porosity of 5 percent.

Figure 5:
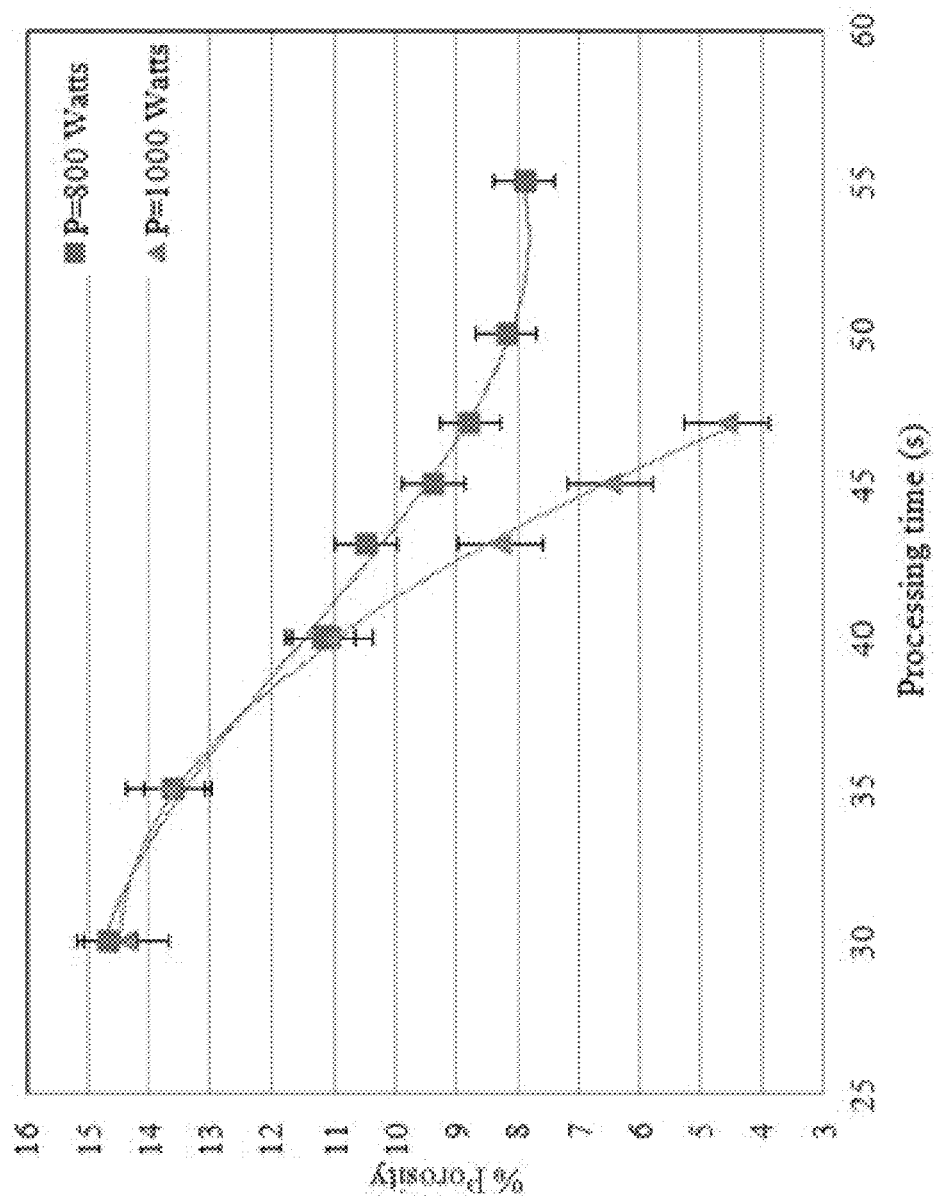
FIG. 5 illustrates plots of the porosity of post-processed objects as a function of microwave power and exposure time according to some embodiments described herein.

For other samples, non-uniform microwave exposure was provided at two different powers (800 W and 1000 W) for different exposure times (30-55 seconds). The porosity of the post-processed samples was calculated for the section of each sample that had the highest microwave interaction. The results are shown in FIG. 5. As illustrated in FIG. 5, the microwave interaction with the samples could be controlled by changing the power level and exposure time.

Example 2

Method of Post-Processing an Object

Figure 6:
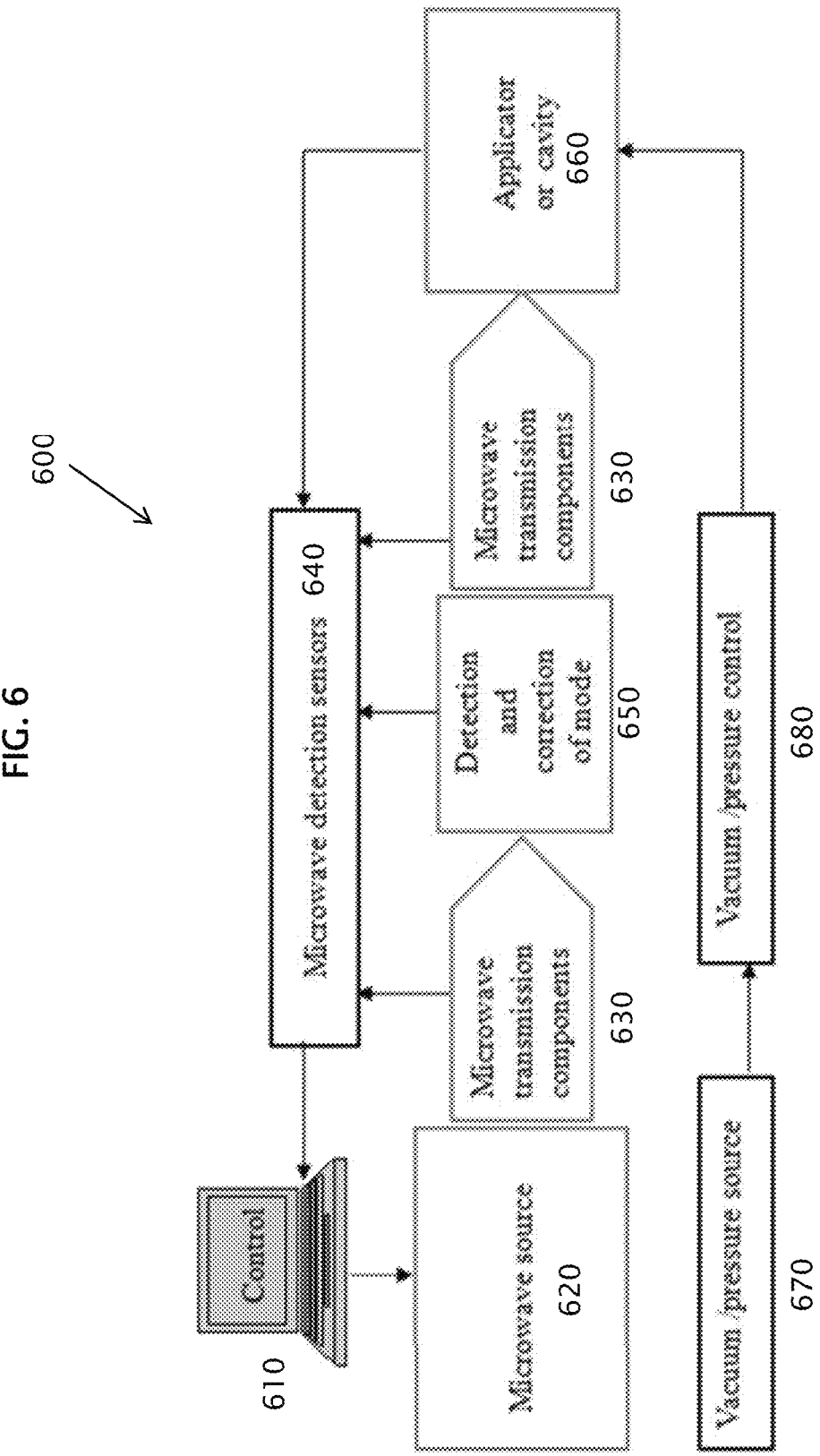
FIG. 6 illustrates schematically a microwave system that can be used to carry out a method of post-processing an object according to one embodiment described herein.

A method of post-processing an object according to one embodiment described herein is carried out as follows. Specifically, the following method comprises altering the mode of microwave exposure during exposure of an object to a field of microwave radiation in a manner described herein. With reference to FIG. 6, a microwave system (600) comprises a computer control component (610), a microwave source (620), microwave transmission components (630), microwave detection sensors (640), components for the detection and correction of microwave mode (650), a multi-mode microwave applicator or cavity (660), a vacuum/pressure source (670), and a vacuum/pressure control component (680). As described hereinabove, the components for the detection and correction of microwave mode (650) can detect the dielectric properties of an object disposed in the cavity (660) during microwave irradiation. Based on instructions and calculations provided by the computer control component (610), the microwave source (620) and microwave transmission components (630) can then alter the distribution of the field within the cavity (660) to provide a desired field distribution for inducing further structural changes within the sample.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A method of post-processing a three-dimensional object made by additive manufacturing, the method comprising:
heating the three-dimensional object to provide the three-dimensional object in a microwave absorptive state after forming the three-dimensional object by an additive manufacturing method; and
exposing the three-dimensional object in the absorptive state to a field of microwave radiation after providing the three-dimensional object made by additive manufacturing in the absorptive state,
wherein the heating comprises heating the three-dimensional object by non-microwave heating, and
wherein the three-dimensional object in the absorptive state has a dielectric loss between 0.1 and 5 at one or more frequencies of the field of microwave radiation.

2. The method of claim 1, wherein exposing the object to the field of microwave radiation is carried out in a microwave cavity.

3. The method of claim 1, wherein the field is a uniform or substantially uniform field of microwave radiation.

4. The method of claim 1, wherein exposing the object to the field of microwave radiation comprises increasing the true density or bulk density of the object.

5. The method of claim 1, wherein exposing the object to the field of microwave radiation comprises reducing the volume of the object.

6. The method of claim 5, wherein the volume of the object is reduced isotropically or substantially isotropically.

7. The method of claim 1 further comprising drying the object prior to exposing the object to the field of microwave radiation.

8. The method of claim 1 further comprising supporting the object with a support structure during exposure of the object to the field of microwave radiation, wherein the support structure facilitates changes in the size of the object.

9. The method of claim 8, wherein the support structure is a form fitting structure disposed on the exterior surface of the object.

10. The method of claim 8, wherein supporting the object with a support structure comprises disposing the object within a box, bag, or mold.

11. The method of claim 8, wherein supporting the object with a support structure comprises coating the exterior surface of the object with a support material.

12. The method of claim 1 further comprising placing the object within a thermally insulating container prior to exposing the object to the field of microwave radiation.

13. The method of claim 1 further comprising applying a pressure to the object during exposure to the field of microwave radiation.

14. The method of claim 1, wherein providing the object in a microwave absorptive state comprises heating the object to a temperature between 100° C. and 250° C. by non-microwave heating.

15. The method of claim 1, wherein:
providing the object in a microwave absorptive state comprises heating the object to a temperature between 100° C. and 250° C. by non-microwave heating; and
exposing the object to the field of microwave radiation comprises increasing the true density or bulk density of the object and reducing the volume of the object isotropically or substantially isotropically.

16. The method of claim 1, wherein exposing the object to the field of microwave radiation alters internal physical structure of the object.

17. The method of claim 4, wherein the true density or bulk density is increased via alteration of physical structure of the object.

18. The method of claim 5, wherein the volume is reduced via alteration of physical structure of the object.

19. The method of claim 1, wherein exposing the three-dimensional object in the absorptive state to a field of microwave radiation does not substantially affect the feature resolution of the three-dimensional object.

* * * * *